United States Patent [19]

Liu et al.

[11] Patent Number: 5,337,868
[45] Date of Patent: Aug. 16, 1994

[54] TOUCH POINT IDENTIFICATION FOR AUTOMATIC CLUTCH CONTROLLER

[75] Inventors: Chia H. Liu, Northville; James M. Slicker, Union Lake, both of Mich.

[73] Assignee: Eaton Corporation, Cleveland, Ohio

[21] Appl. No.: 126,107

[22] Filed: Sep. 23, 1993

Related U.S. Application Data

[63] Continuation-in-part of Ser. No. 815,501, Jan. 2, 1992, abandoned.

[51] Int. Cl.$^5$ .................... B60K 41/02; B60K 41/28
[52] U.S. Cl. ..................................................... 477/74
[58] Field of Search ............... 192/0.09, 0.044, 0.033, 192/0.076, 103 R

[56] References Cited

U.S. PATENT DOCUMENTS

| | | | |
|---|---|---|---|
| 3,297,926 | 1/1967 | Campbell et al. | 318/138 |
| 4,081,065 | 3/1978 | Smyth et al. | 192/0.076 |
| 4,457,411 | 7/1984 | Hiramatsu | 192/0.076 |
| 4,576,265 | 3/1986 | Kumura et al. | 192/0.044 X |
| 4,674,609 | 6/1987 | Sturges et al. | 192/0.033 |
| 4,724,939 | 2/1988 | Lockhart et al. | 192/3.3 |
| 4,732,246 | 3/1988 | Tateno et al. | 192/0.076 X |
| 4,766,544 | 8/1988 | Kurihara et al. | 364/424 |
| 4,766,967 | 8/1988 | Slicker et al. | 180/54.1 |
| 4,768,635 | 9/1988 | Sakurai et al. | 192/0.076 |
| 4,792,902 | 12/1988 | Hrovat et al. | 364/424 |
| 4,823,925 | 4/1989 | Ohkumo et al. | 192/0.076 |
| 4,899,858 | 2/1990 | Cote' et al. | 192/0.09 |
| 4,993,527 | 2/1991 | Benford et al. | 192/0.076 |
| 5,029,678 | 7/1991 | Koshizawa | 192/0.076 |
| 5,170,868 | 12/1992 | Yamashita et al. | 192/0.09 X |
| 5,293,316 | 3/1994 | Slicker | 192/0.076 X |

FOREIGN PATENT DOCUMENTS

2153954  8/1985  United Kingdom .
2231116  11/1990  United Kingdom .

OTHER PUBLICATIONS

"Computer Controlled Systems", K. J. Astrom, B. Wittenmark, pp. 216–218.

*Primary Examiner*—Andrea L. Pitts
*Attorney, Agent, or Firm*—Krass & Young

[57] ABSTRACT

This invention provides automatic and reliable determination of the touch point of a clutch controlled by an automatic clutch actuation controller. This invention determines the touch point while idling the engine, with the transmission in neutral and an inertial brake applied. The clutch actuation controller engages the clutch so that the measured transmission input speed matches a reference speed signal preferably between 40% and 60% of the idle speed. This reliably provides the degree of clutch engagement at a small torque matching the braking torque. When the transmission input speed is within a predetermined amount of the reference speed signal, such as 4%, this invention determines the clutch touch point corresponding to the degree of clutch engagement. This degree of clutch engagement may be a clutch position signal or a clutch pressure signal produced by an existing sensor used in the automatic clutch control. If no measured clutch engagement signal is available, this degree of clutch engagement may be the clutch engagement signal used to control the degree of clutch engagement. The touch point is set as the difference between this degree of clutch engagement for the small torque and a clutch touch point offset. The determination may begin with the clutch fully engaged and gradually released according to control by the input and reference speeds. When the previous touch point is known, the clutch is preferably initially positioned just above the known touch point and then gradually released.

26 Claims, 4 Drawing Sheets

TOUCH POINT IDENTIFICATION FOR AUTOMATIC CLUTCH CONTROLLER

This application is a continuation-in-part of U.S. application Ser. No. 07/815,501, filed Jan. 2, 1992, now abandoned.

TECHNICAL FIELD OF THE INVENTION

The technical field of this invention is that of automatic clutch controls, and more particularly the determination of the clutch position for initial torque transmission in an automatic clutch controller.

BACKGROUND OF THE INVENTION

In recent years there has been a growing interest in increased automation in the control of the drive train of motor vehicles, and most especially in control of the drive train of large trucks. The use of automatic transmissions in passenger automobiles and light trucks is well known. The typical automatic transmission in such a vehicle employs a fluid torque converter and hydraulically actuated gears for selecting the final drive ratio between the engine shaft and the drive wheels. This gear selection is based upon engine speed, vehicle speed and the like. It is well known that such automatic transmissions reduce the effectiveness of the transmission of power from the engine to the drive shaft, with the consummate reduction in fuel economy and power as compared with the skilled operation of a manual transmission. Such hydraulic automatic transmissions have not achieved wide spread use in large motor trucks because of the reduction in efficiency of the operation of the vehicle.

One of the reasons for the loss of efficiency when employing a hydraulic automatic transmission is loss occurring in the fluid torque converter. A typical fluid torque converter exhibits slippage and consequent loss of torque and power in all modes. It is known in the art to provide lockup torque converters that provide a direct link between the input shaft and the output shaft of the transmission above certain engine speeds. This technique provides adequate torque transfer efficiency when engaged, however, this technique provides no gain in efficiency at lower speeds.

It has been proposed to eliminate the inefficiencies inherent in a hydraulic torque converter by substitution of an automatically actuated friction clutch. This substitution introduces another problem not-exhibited in the use of the hydraulic torque converters. Friction clutches used exhibit considerable motion prior to initial clutch engagement. This point of initial clutch engagement is called the touch point. No torque can be transferred through the clutch for clutch engagement before the touch point. The clutch controller preferably uses the touch point as the zero position for its control algorithm. Since no controlled torque transfer can take place prior to the touch point, the clutch controller preferably rapidly advances the clutch to this point when controlling clutch engagement.

Thus it would be an advantage to provide automatic clutch actuation of a friction clutch that includes a reliable and automatic manner for determination of the clutch touch point.

SUMMARY OF THE INVENTION

This invention provides automatic and reliable determination of the touch point of a clutch controlled by an automatic clutch actuation controller. This invention is employed in a combination including an engine, a friction clutch, a multi-speed transmission having a neutral position, at least one inertially-loaded traction wheel connected to the output of the multi-speed transmission, and an automatic clutch controller.

This invention determines the touch point while idling the engine, with the transmission in neutral and an inertial brake applied. This inertial brake is ordinarily used to slow the transmission input shaft to match speeds during up shifts. The braking torque of the inertial brake is about 5% of the idling torque of the engine.

The clutch actuation controller engages the clutch so that the measured transmission input speed matches a reference speed signal less than the idle speed. In the preferred embodiment the reference speed signal is between 40% and 60% of the idle speed. The clutch actuation controller preferably subtracts a filtered measured transmission input speed signal from a reference speed signal filtered to prevent application of a step function input. This error speed is used to control the degree of clutch engagement. This reliably provides the degree of clutch engagement at a small torque matching the braking torque.

This invention detects when the transmission input speed is within a predetermined amount of the reference speed signal. In the preferred embodiment this predetermined amount is 4% of the reference speed signal. Upon detection of these conditions, this invention determines the clutch touch point corresponding to the degree of clutch engagement. This degree of clutch engagement may be a clutch position signal or a clutch pressure signal produced by an existing sensor used in the automatic clutch control. If no measured clutch engagement signal is available, this degree of clutch engagement may be the clutch engagement signal used to control the degree of clutch engagement. The signal corresponding to the degree of clutch engagement is preferably low pass filtered. The touch point is set as the difference between this degree of clutch engagement for the small torque and a clutch touch point offset. This clutch touch point offset shifts the signal to take into account the difference in clutch engagement between that which provides the small torque to overcome the brake and that which first provides a non-zero torque.

BRIEF DESCRIPTION OF THE DRAWINGS

These and other objects and aspects of the present invention will be described below in conjunction with the drawings in which.

DETAILED DESCRIPTION OF THE PREFERRED EMBODIMENTS

Figure 1:
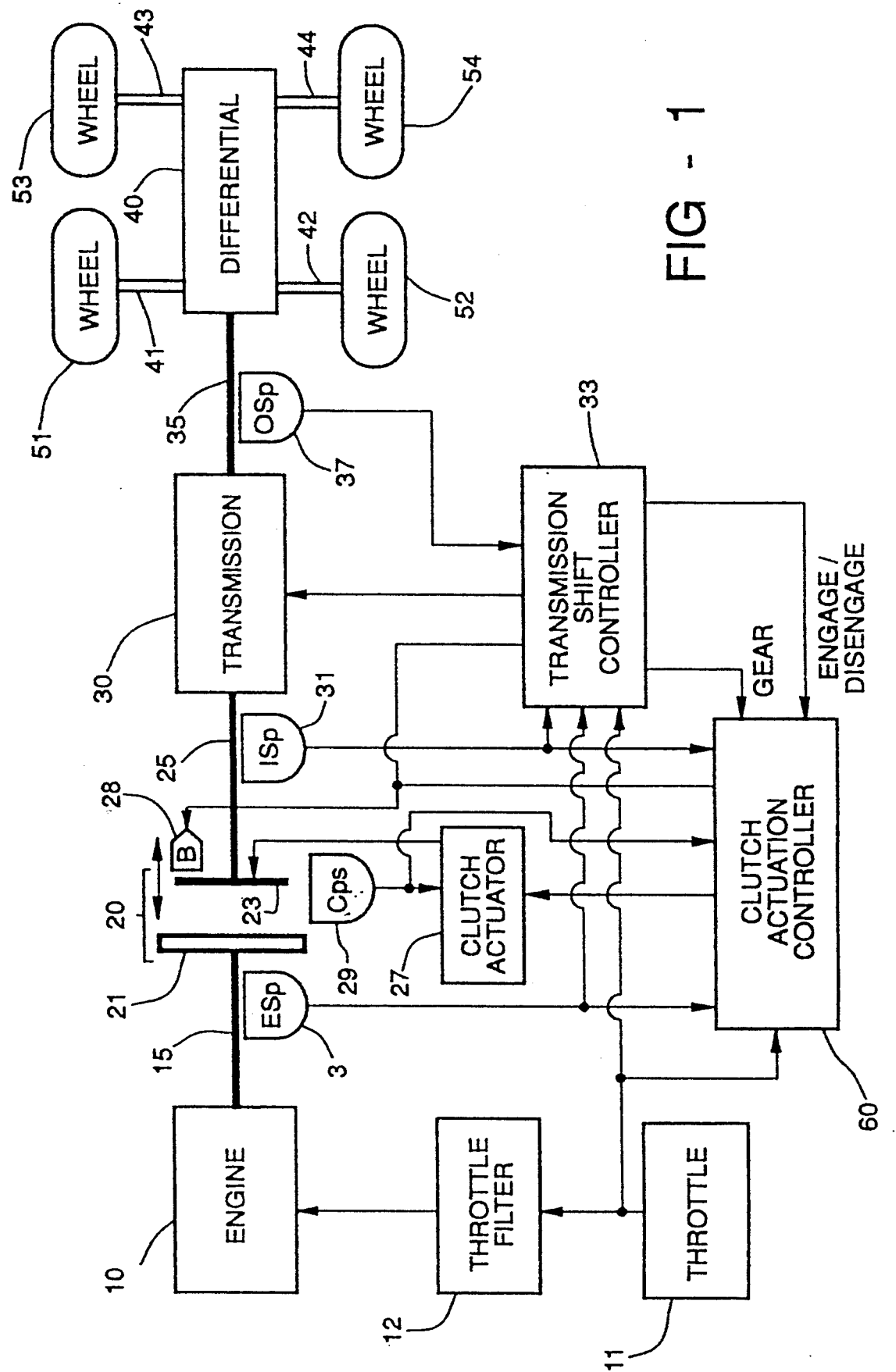
FIG. 1 illustrates a schematic view of the vehicle drive train including the clutch actuation controller of the present invention.

FIG. 1 illustrates in schematic form the drive train of a motor vehicle including the automatic clutch controller of the present invention. The motor vehicle includes engine 10 as a source of motive power. For a large truck of the type to which the present invention is most applicable, engine 10 would be a diesel internal combustion engine. Throttle 11, which is typically a foot operated pedal, controls operation of engine 10 via throttle filter 12. Throttle filter 12 filters the throttle signal supplied to engine 10 by supplying a ramped throttle signal upon receipt of a step throttle increase via throttle 11. Engine 10 produces torque on engine shaft 15. Engine speed sensor 13 detects the rotational velocity of engine shaft 15. The actual site of rotational velocity detection by engine speed sensor may be at the engine flywheel. Engine speed sensor 13 is preferably a multitooth wheel whose tooth rotation is detected by a magnetic sensor.

Friction clutch 20 includes fixed plate 21 and movable plate 23 that are capable of full or partial engagement. Fixed plate 21 may be embodied by the engine flywheel. Friction clutch 20 couples torque from engine shaft 15 to transmission input shaft 25 corresponding to the degree of engagement between fixed plate 21 and movable plate 23. Note that while FIG. 1 illustrates only a single pair of fixed and movable plates, those skilled in the art would realize that clutch 20 could include multiple pairs of such plates.

Figure 2:
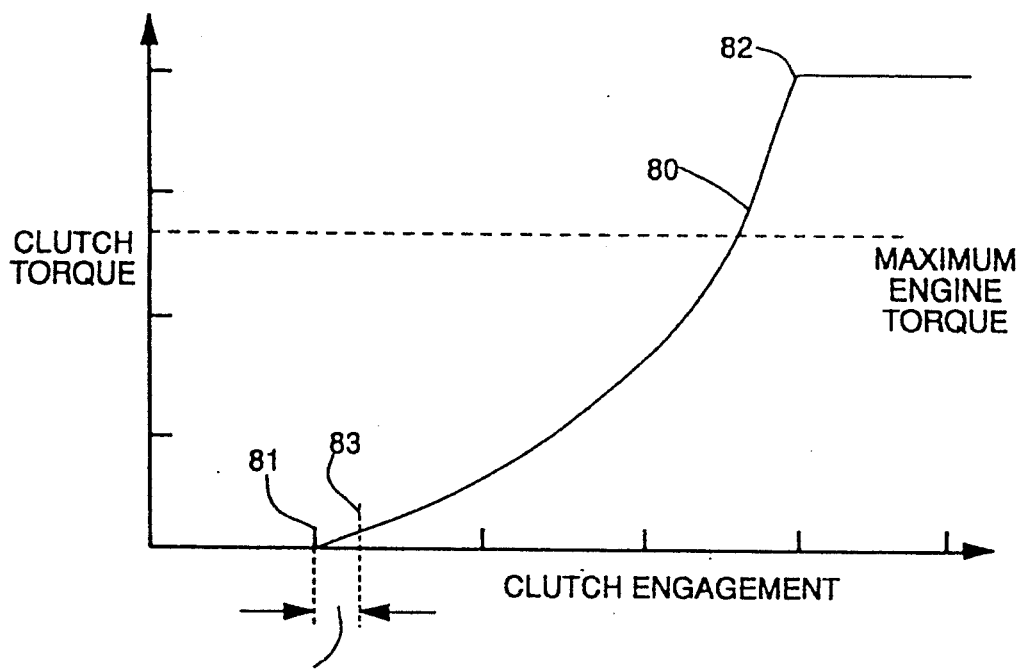
FIG. 2 illustrates the typical relationship between clutch engagement and clutch torque.

A typical torque verses clutch position function is illustrated in FIG. 2. Clutch torque/position curve 80 is initially zero for a range of engagements before initial touch point 81. Clutch torque rises monotonically with increasing clutch engagement. In the example illustrated in FIG. 2, clutch torque rises slowly at first and then more steeply until the maximum clutch torque is reached upon full engagement at point 82. The typical clutch design calls for the maximum clutch torque upon full engagement to be about 1.5 times the maximum engine torque. This ensures that clutch 20 can transfer the maximum torque produced by engine 10 without slipping.

Clutch actuator 27 is coupled to movable plate 23 for control of clutch 20 from disengagement through partial engagement to full engagement. Clutch actuator 27 may be an electrical, hydraulic or pneumatic actuator and may be position or pressure controlled. Clutch actuator 27 controls the degree of clutch engagement according to a clutch engagement signal from clutch actuation controller 60. In accordance with the preferred embodiment of this invention, clutch actuator 27 is a closed loop controller. Clutch actuator 27 controls the degree of clutch engagement to cause the measured clutch position from clutch position sensor 29 to follow the clutch engagement signal. The touch point determination preferably employs the measured clutch position from clutch position sensor 29. Those skilled in the art would realize that clutch actuator 27 may be pressure controlled by a clutch actuation signal corresponding to the desired clutch pressure and employ clutch pressure feedback measured by a clutch pressure sensor.

Transmission input speed sensor 31 senses the rotational velocity of transmission input shaft 25, which is the input to transmission 30. Transmission 30 provides selectable drive ratios to drive shaft 35 under the control of transmission shift controller 33. Drive shaft 35 is coupled to differential 40. Transmission output speed sensor 37 senses the rotational velocity of drive shaft 35. Transmission input speed sensor 31 and transmission output speed sensor 37 are preferably constructed in the same manner as engine speed sensor 13. In the preferred embodiment of the present invention, in which the motor vehicle is a large truck, differential 40 drives four axle shafts 41 to 44 that are in turn coupled to respective wheels 51 to 54.

Transmission shift controller 33 receives input signals from throttle 11, engine speed sensor 13, transmission input speed sensor 31 and transmission output speed sensor 37. Transmission shift controller 33 generates gear select signals for control of transmission 30 and clutch engage/disengage signals coupled to clutch actuation controller 60. Transmission shift controller 33 preferably changes the final gear ratio provided by transmission 30 corresponding to the throttle setting, engine speed, transmission input speed and transmission output speed. Transmission shift controller 33 provides respective engage and disengage signals to clutch actuation controller 60 depending on whether friction clutch 20 should be engaged or disengaged. Transmission shift controller also transmits a gear signal to clutch actuation controller 60. This gear signal permits recall of the set of coefficients corresponding to the selected gear. Transmission shift controller 33 preferably briefly engages inertial brake 29 during upshifts. This slows the rotational speed of transmission input shaft 25 to match that of drive shaft 35 before engaging the higher gear. The touch point determination of this invention preferably employs inertial brake 29 in a manner that will be described below. Note transmission shift controller 33 forms no part of the present invention and will not be further described.

Clutch actuation controller 60 provides a clutch engagement signal to clutch actuator 27 for controlling the position of movable plate 23. This controls the amount of torque transferred by clutch 20 according to clutch torque/position curve 80 of FIG. 2. Clutch actuation controller 60 operates under the control of transmission shift controller 33. Clutch actuation controller 60 controls the movement of moving plate 23 from disengagement to at least partial engagement or full engagement upon receipt of the engage signal from transmission shift controller 33. In the preferred embodiment it is contemplated that the clutch engagement signal will indicate a desired clutch position. Clutch actuator 27 preferably includes a closed loop control system employing the measured clutch position from clutch position sensor 29 for controlling movable plate 23 to this desired position. It is also feasible for the clutch engagement signal to represent a desired clutch pressure with clutch actuator 27 providing closed loop control to this desired pressure. Depending on the particular vehicle, it may be feasible for clutch actuator 27 to operate in an open loop fashion. The exact details of clutch actuator 27 are not crucial to this invention and will not be further discussed.

Clutch actuation controller 60 preferably generates a predetermined open loop clutch disengagement signal for a ramped out disengagement of clutch 20 upon receipt of the disengage signal from transmission shift controller 33. No adverse oscillatory responses are anticipated for this predetermined open loop disengagement of clutch 20.

The control function of clutch actuation controller 60 is needed only for clutch positions between touch point 81 and full engagement. Clutch engagement less than that corresponding to touch point 81 provide no possibility of torque transfer because clutch 20 is fully disengaged. The present invention is a manner of detection of the clutch position corresponding to touch point 81. Upon receipt of the engage signal from transmission shift controller 33, clutch actuation controller 60 preferably rapidly advances clutch 20 to a point corresponding to touch point 81. This sets the zero of the clutch engagement control at touch point 81. Thereafter the clutch engagement is controlled by the control function of clutch actuation controller 60.

Figure 3:
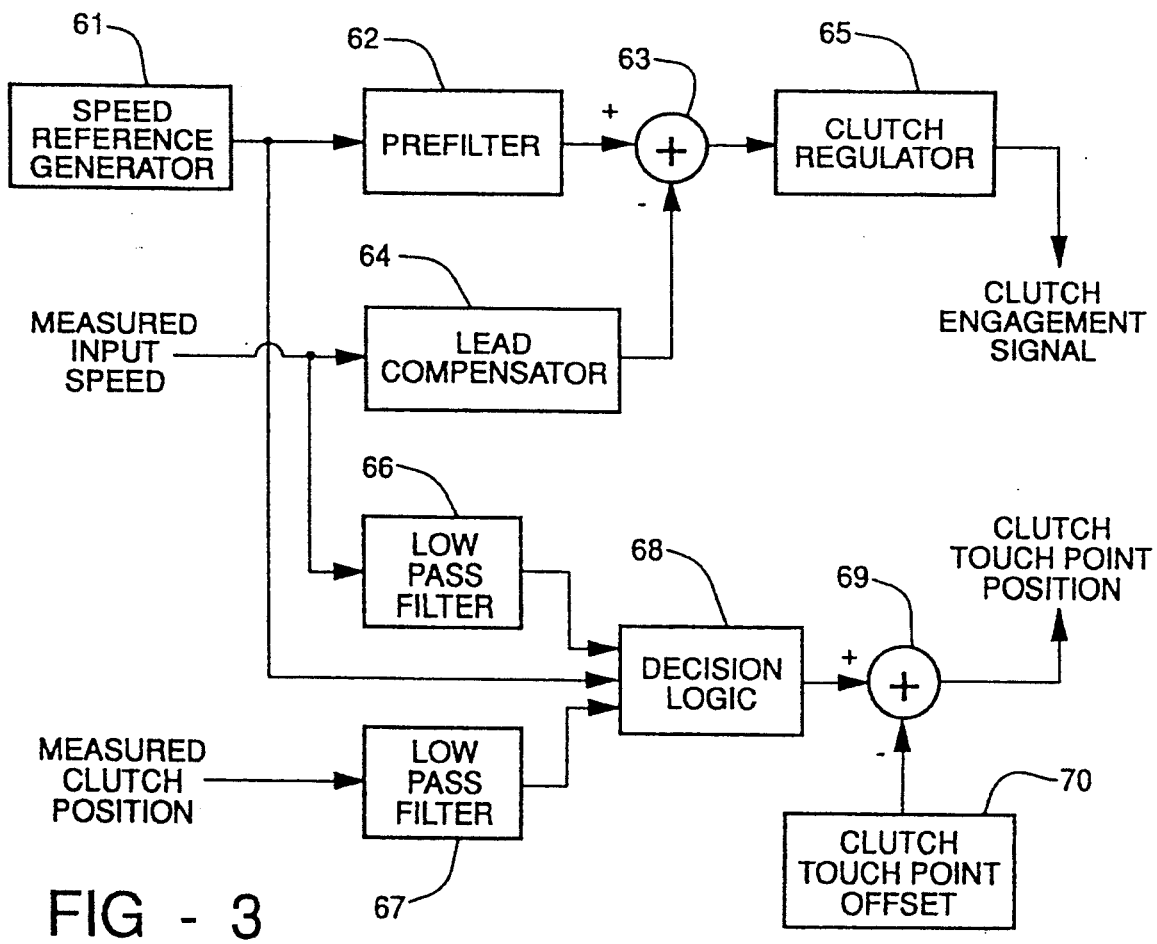
FIG. 3 illustrates schematically an embodiment of the clutch touch point determination.

FIG. 3 illustrates schematically the determination of the touch point for clutch 20. This process is preferably a subset of the control function of clutch actuation controller 60. Determination of the touch point involves putting transmission 30 in neutral and applying inertial brake 29. Clutch 20 is progressively engaged while engine 10 is idling until the transmission input speed reaches a predetermined fraction of the engine idle speed. This degree of clutch engagement, corresponding to point 83 of FIG. 2, transfers torque through clutch 20 to overcome the slight braking torque of inertial brake 29. A small, fixed offset 85 is subtracted from this degree of clutch engagement to determine the touch point 81.

The touch point determination process begins with setting the proper initial conditions. These initial conditions include engine 10 idling, transmission 30 in neutral and inertial brake 29 engaged. Inertial brake 29 is normally present to aid in matching the rotational speed of transmission input shaft 25 to that of drive shaft 35 during upshifts. Because clutch 20 is disengaged during the shift the amount of braking needed is very small. Inertial brake 29 need only develop a braking torque of about 5% of the idling engine torque.

Speed reference generator 61 generates a reference speed signal. This reference speed signal should correspond to about 40% to 60% of the engine idle speed. This reference speed signal must be less than the engine idle speed because the touch point determination requires clutch slippage while engine 10 idles. The speed reference signal is filtered via prefilter 62. Prefilter 62 is provided to prevent the application of a step function speed reference signal to the control process.

An error speed signal is formed in algebraic summer 63. The error speed signal is the difference between the speed reference signal filtered by prefilter 62 minus a filtered input speed signal. Transmission input speed sensor 31 generates a transmission input speed signal corresponding to the rotational speed of the transmission input shaft 25. A lead compensator 64 filters the transmission input speed signal prior to formation of the difference.

The speed error signal drives clutch regulator 65, which produces a clutch engagement signal for application to clutch actuator 27. This is similar to operation of clutch actuation controller 60 during reengagement of clutch 20 following transmission shifts. Clutch actuator 27 engages clutch 20 to a degree corresponding to the clutch actuation signal. Because the degree of clutch engagement determines the amount of torque coupled to transmission input shaft 25 and hence the measured transmission input speed, this forms a feedback system. Selection of the reference speed signal less than the engine idle speed ensures that clutch 20 slips when the speed error signal is driven to zero. The amount of torque required to overcome the braking torque of inertial brake 29 is so small that it does not stall engine 10.

Decision logic unit 68 makes the clutch touch point determination. Decision logic unit 68 receives the measured transmission input speed signal filtered via low pass filter 66. Decision logic unit 68 also receives the measured clutch position signal from clutch position sensor 29 filtered via low pass filter 67. Lastly, decision logic unit 68 receives the reference speed signal from speed reference generator 61. Decision logic unit 68 determines when a steady state is reached by comparing the filtered input speed signal with the reference speed signal. Steady state is defined as when the filtered input speed signal is within a predetermined fraction, such as 4%, of the reference speed signal. When this state is reached, decision logic unit 68 determines point 83 as the filtered measured clutch position signal.

A second algebraic summer 69 determines the clutch position for touch point 81. Clutch touch point offset generator 70 generates a clutch touch point offset signal corresponding to the distance 85 shown in FIG. 2. This amount is fixed for a particular vehicle and depends upon the clutch torque/position curve 80 and the braking torque of inertial brake 29. In the preferred embodiment of this invention this clutch touch point offset signal is 6.8% of the full travel of clutch 20. Second algebraic summer 69 forms a clutch touch point signal corresponding to the difference between the filtered measured clutch position signal from decision logic unit 68 minus the clutch touch point offset signal.

Figure 4:
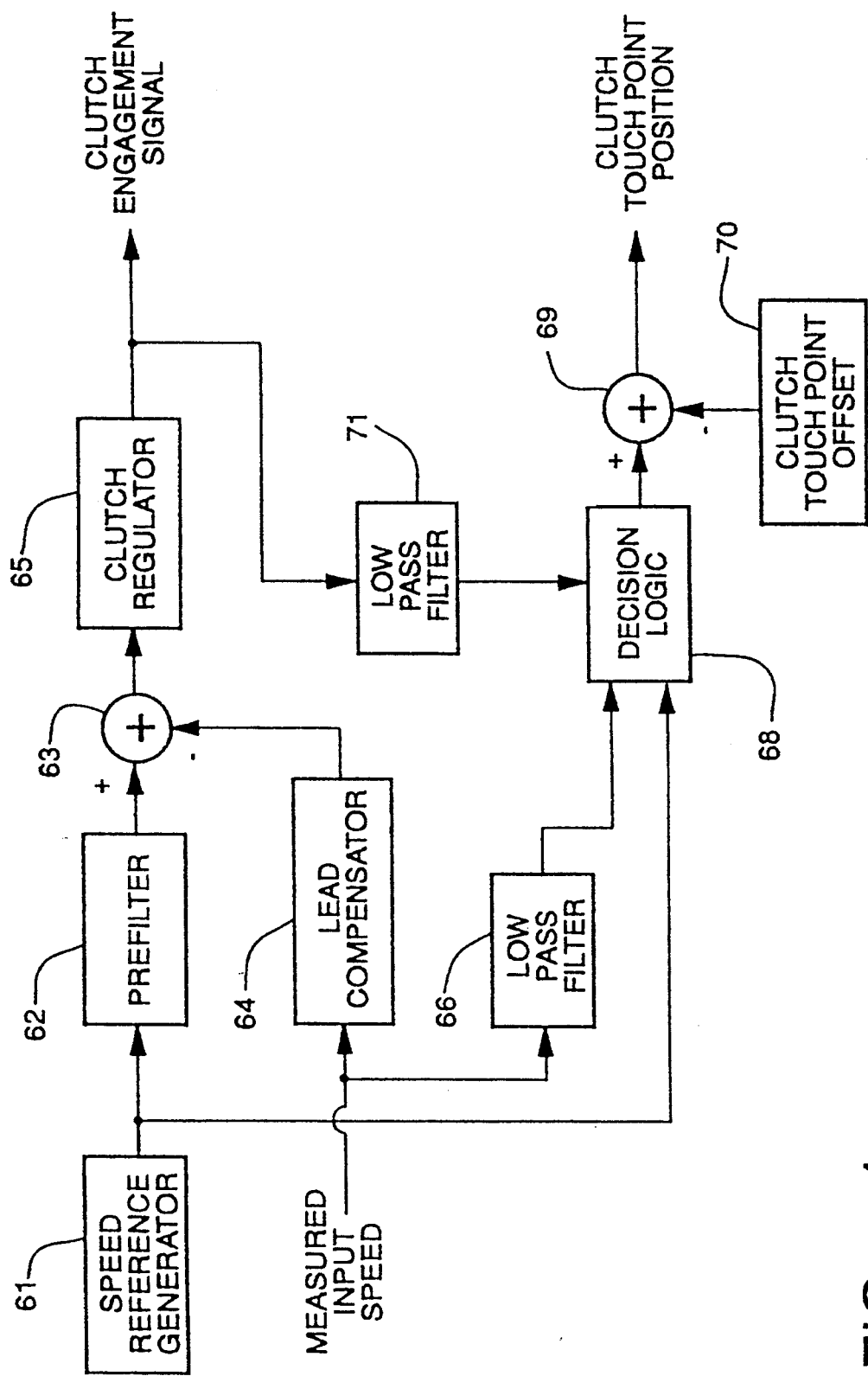
FIG. 4 illustrates an alternative embodiment of the clutch touch point determination.

FIG. 4 illustrates an alternative embodiment of this invention. This alternative may be used when no measurement of the degree of clutch engagement is available. Low pass filter 71, which is similar to low pass filter 67 illustrated in FIG. 3, filters the clutch engagement signal from clutch regulator 65. Since this signal will be available, and because clutch actuator 27 provides clutch engagement corresponding to this signal, it may be used as the measure of clutch engagement. Decision logic unit 68 determines when the filtered input speed signal is within 4% of the reference speed signal. When this state is reached, decision logic unit 68 determines point 83 as the filtered clutch engagement signal. Other portions of the embodiment of FIG. 4 operate as previously described in conjunction with FIG. 3.

Clutch actuation controller 60, including the determination of the clutch touch point, is preferably realized via a microcontroller circuit. Inputs corresponding to the engine speed, the transmission input speed, the throttle setting and clutch position must be in digital form. These input signals are preferably sampled at a rate consistent with the rate of operation of the microcontroller and fast enough to provide the desired control. As previously described, the engine speed, transmission input speed and transmission output speed are preferably detected via multitooth wheels whose teeth rotation is detected by magnetic sensors. The pulse trains detected by the magnetic sensors are counted during predetermined intervals. The respective counts are directly proportional to the measured speed. For proper control the sign of the transmission input speed signal must be negative if the vehicle is moving backwards. Some manner of detecting the direction of rotation of drive shaft 35 is needed. Such direction sensing is conventional and will not be further described. The throttle setting and clutch position are preferably detected via analog sensors such as potentiometers. These analog signals are digitized via an analog-to-digital converter for use by the microcontroller. The microcontroller executes the processes illustrated in FIGS. 3 and 4 by discrete difference equations in a manner known in the art. The control processes illustrated in FIG. 3 and 4 should therefore be regarded as an indication of how to program the microcontroller embodying the invention rather than discrete hardware. It is feasible for the same microcontroller, if of sufficient capacity and properly programmed, to act as both clutch actuation controller 60, including the clutch point determination of this invention, and as transmission shift controller 33. It is believed that an Intel 80C196 microcontroller has sufficient computation capacity to serve in this manner.

As noted above, the elements of FIGS. 3 and 4 are preferably implemented via discrete difference equations in a microcontroller. The numerical values in the descrete difference equations are a function of the processor sampling rate. The particular values given below are based upon a sampling rate of 100 KHz. A lower sampling rate is feasible, which would require different coefficient values to achieve the same filter response. Adjustment of these coefficients for the sampling rate is within the ordinary skill in the art. In the preferred embodiment the i-th value of the output $P_i$ of prefilter 62 is given by:

$$P_i = 0.98\ P_{i-1} + 0.02\ S_{ref} \qquad (1)$$

where; $O_{i-1}$ is the immediately preceding value of the prefilter output; and $S_{ref}$ is the input reference speed signal. The i-th output $SComp_i$ of lead compensator 64 is preferably given by:

$$SComp_i = 0.63265\ SCOMP_{i-1} + 2.6327\ SIN_i - 2.2653\ SIn_{i-1} \qquad (2)$$

where: $SComp_{i-1}$ is the prior value of the compensator output; $SIn_1$ is the current value of the transmission input speed signal; $SIn_{i-1}$ is the next preceding value of the transmission input speed signal. The i-th value of the clutch engagement signal $CEng_i$ generated by clutch regulator 65 is given by:

$$CEng_i = CEng_{i-1} + SErr_i - 0.98\ SErr_{i-1} \qquad (3)$$

where: $CEng_{i-1}$ is the immediately preceding value of the clutch engagement signal; $SErr_i$ is the current value of the speed error signal; and $SErr_{i-1}$ is the immediately preceding value of the speed error signal. The i-th value of the filtered transmission input speed signal $SFil_i$ from low pass filter 66 is given by:

$$SFil_i = 1.7667\ SFil_{i-1} - 0.7866\ SFil_{i-2} + 0.02\ SIn_i \qquad (4)$$

where: $SFil_{i-1}$ is the immediately prior value of the filtered transmission input speed signal; and $SFil_{i-2}$ is the next prior value of the filtered transmission input speed signal. Lastly, the i-th value of the filtered measured clutch position signal $CFil_i$ is given by:

$$CFil_i = 0.98\ CFil^{i-1} + 0.02\ CPos_i \qquad (5)$$

where: $CFil^{i-1}$ is the immediately preceding value of the filtered measured clutch position signal.

This technique provides an advantageous determination of the touch point. This technique is based upon a measure of clutch engagement which transfers a known, small torque. Because the transmission is in the neutral position, there are no other torques applied to transmission input shaft 25 and thus no disturbing forces. By measuring the clutch engagement which transfers this known, small torque the touch point may be more reliably estimated than looking for the initial torque transfer point. The feedback system ensures that the degree of engagement that transfers this small torque is reliably reached. This cannot be done as easily at the initial torque transfer point. Additionally, the inertial brake and the clutch engagement sensor are generally already provided in the base system, thus no additional hardware is required.

Figure 5:
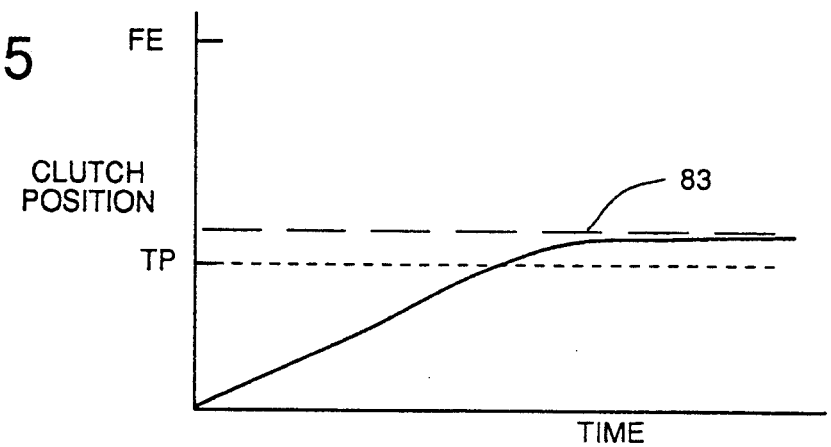
FIG. 5 graphically illustrates the operation of the embodiment of FIG. 3.

The operation of this system as described above starts with the initial condition of the transmission in neutral, the engine idling, the inertia brake applied and the clutch in released or fully disengaged position. Then, as graphically shown in FIG. 5, the clutch is gradually applied or moved toward engaged position until it just passes the touch point TP and the measured input speed attains the reference speed. In this case the movement of the clutch is driven by the difference between the input speed and the reference, the input speed initially being zero and thus much lower than the reference.

An alternative operation of the same system starts with the initial condition of the transmission in neutral, the engine idling, the inertia brake applied and the clutch in applied or fully engaged position. The, as graphically shown in FIG. 6, curve A, the clutch, beginning at the fully engaged (FE) position is gradually released or disengaged until it approaches the point 83 (defined re FIG. 2) which is above the touch point where the clutch can begin to slip under the influence of the inertia brake, and the measured input speed attains the reference speed. As in the previous case, the movement of the clutch is driven by the difference between the input speed and the reference, but here the input speed is initially engine idle speed and thus is much higher than the reference. This alternative approach offers the advantage of better control. The inertial brake, having a small torque input, affects the speed gradually as the clutch releases and thus the rate of speed decay is slow and easy to control as opposed to the clutch engagement approach wherein the inertial brake is quickly overcome by the high torque capacity of the engaging clutch.

Figure 6:
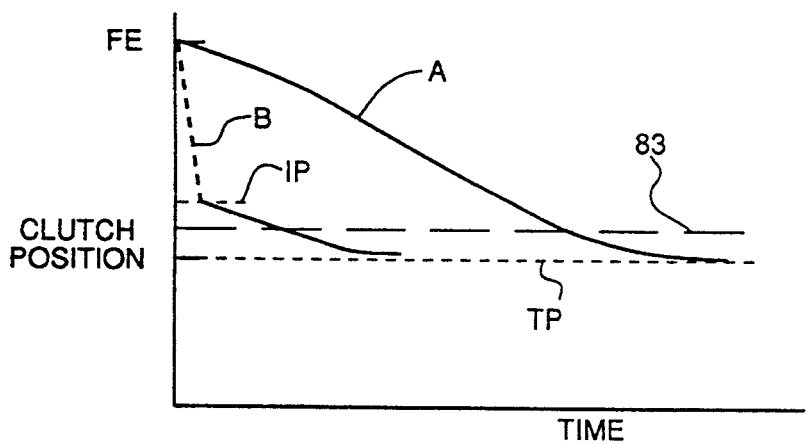
FIG. 6 graphically illustrates the operation of a third embodiment of the invention.

By slightly altering the system, a further improvement is incorporated to obtain quicker results as shown by curve B in FIG. 6. This is applicable where there is a past knowledge of the touch point, so that the clutch can be moved from its fully engaged position to an initialized position IP near the touch point to begin the gradual clutch release. Even though the prior touch point is known, it is not sufficient to rely only on that value for the current touch point because system changes due to aging, wear, or temperature variations cause changes in the touch point as well. Accordingly the touch point is desirably updated each time the vehicle powers up. Thus the system of FIG. 3 is amended by including a memory for storing the previous touch point and an initialization control for moving the clutch to the initialization point IP on the basis of the prior touch point.

Figure 7:
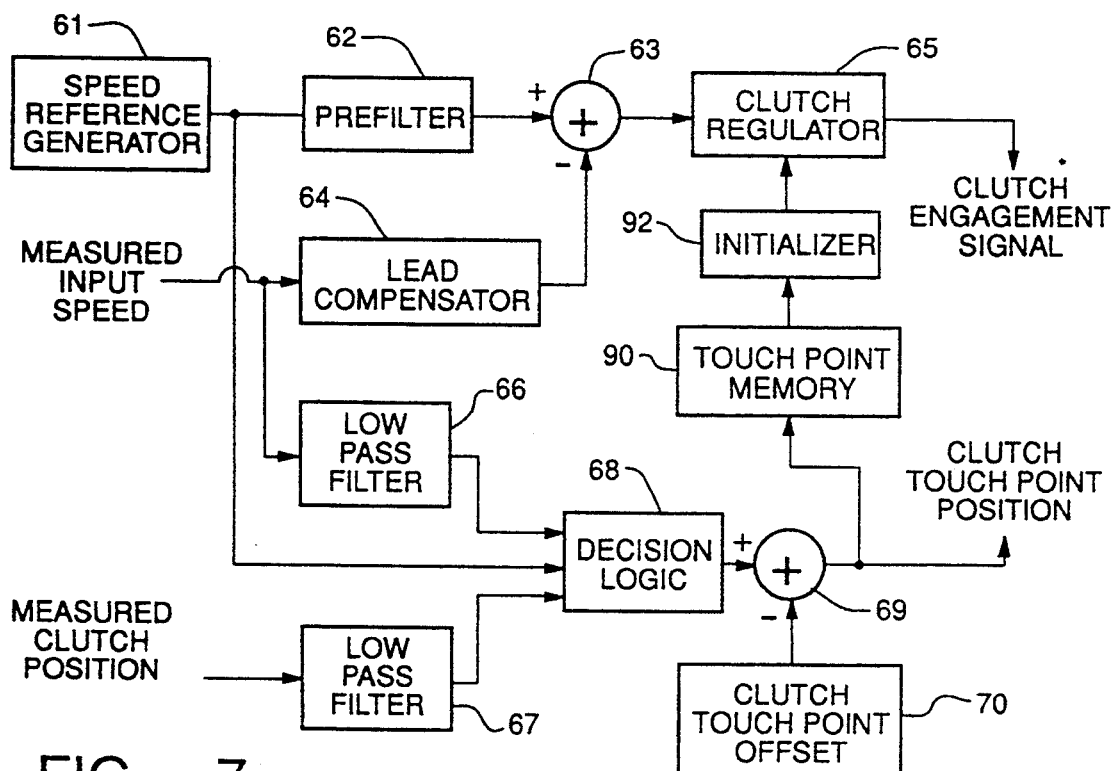
FIG. 7 illustrates schematically the third embodiment of the clutch touch point determination.

As shown in FIG. 7, the amended system is the same as that of FIG. 3 except for the addition of a touch point memory circuit 90 and an initialization circuit 92. The touch point memory 90 has an input coupled to the output of the summer 69 and stores the most recent of the previously determined touch points, or even several of the most recent touch points for determination of a running average. The memory preferably comprises a portion of the system microcontroller memory. The initialization circuit 92 is coupled to the memory 90 and the clutch regulator 65 and calculates an initial clutch position IP based on ne or more of the recent known touch points. The initial clutch position IP must be sufficiently above the previous touch point so that further release movement of the clutch can be used to find the touch point. The initial clutch position may, for example, be the previous touch point plus a fixed increment. A signal is sent from the initializer 92 to the clutch regulator 65 to force the clutch to the position IP. Then the previously described clutch control, based on the difference between the measured input speed and the reference speed, takes over to generally move to the point 83 or somewhat below point 83. The clutch touch point offset is applied as for the FIG. 3 system to determine the actual touch point, but the offset may have a smaller value.

Thus the techniques described relevant to FIGS. 6 and 7 have the ascribed advantages of the FIGS. 3 and 4 systems to reliably provide the touch point without additional mechanical elements in the system and may be implemented mainly by microcontroller programming. Moreover these techniques more controllably advance the clutch without abrupt acceleration or deceleration of the input shaft for more accurate determination of clutch point.

We claim:

1. In a combination including a source of motive power having a predetermined idle speed, a source of motive power having a predetermined idle speed, a friction clutch for controllably transferring torque from the source of motive power to a clutch output shaft, a multi-speed transmission having an input shaft connected to the clutch output shaft and including a neutral position, at least one inertially-loaded traction wheel connected to the output shaft of the multi-speed transmission, and an automatic clutch controller for control of a degree of clutch engagement, a touch point determinator comprising:
 a reference speed generator for generating a reference speed signal that corresponds to a predetermined fraction of idle speed of the source of motive power;
 a transmission input speed sensor connected to the output shaft of the friction clutch for generating a transmission input speed signal corresponding to a rotational speed of the output shaft of the friction clutch;
 an inertial brake selectively engagable for applying a predetermined braking torque to the output shaft of the friction clutch;
 a clutch actuator connected to the friction clutch for controlling actuation of the friction clutch between disengaged and fully engaged according to a clutch engagement signal; and
 a controller connected to said reference speed generator, said transmission input speed sensor, said inertial brake, said clutch actuator and said clutch engagement sensor including
  an inertial brake engager for engaging said inertial brake during touch point determination when the source of motive power is idling and the multi-speed transmission is in neutral,
  a first algebraic summer connected to said reference speed generator and said transmission input speed sensor generating a first algebraic sum signal corresponding to the difference between (1) said reference speed signal and (2) said transmission input speed signal,
  a compensator connected to said first algebraic summer for generating said clutch engagement signal for supplying to said clutch actuator for actuating the friction clutch to a degree to minimize said first algebraic sum signal, and
  a decision logic unit connected to said reference speed generator, said transmission input speed sensor and said clutch engagement sensor for setting a clutch touch point signal equal to a measure of clutch engagement if said transmission input speed signal is within a predetermined amount of said reference speed signal when said inertial break is engaged and the multi-speed transmission is in the neutral position.

2. The touch point determinator as claimed in claim 1, further comprising:
 a clutch engagement sensor connected to the friction clutch for generating a measured clutch engagement signal corresponding to the degree of engagement of the friction clutch; and
 said decision logic unit of said controller sets said clutch touch point signal equal to said measured clutch engagement signal when said transmission input speed signal is within said predetermined amount of said reference speed signal.

3. The touch point determinator as claimed in claim 2, wherein:
 said clutch engagement sensor consists of a clutch position sensor generating a measured clutch position signal;
 said clutch actuator controls the position of the friction clutch corresponding to a desired clutch position indicated by said clutch engagement signal; and
 said controller wherein
  said compensator generates said clutch engagement signal indicative of clutch position, and
  said decision logic unit generates said clutch touch point signal indicative of clutch position.

4. The touch point determinator as claimed in claim 2, wherein:
 said clutch engagement sensor consists of a clutch pressure sensor generating a clutch pressure signal;
 said clutch actuator controls the pressure of the friction clutch corresponding to a desired clutch pressure indicated by said clutch engagement signal; and
 said controller wherein
  said compensator generates said clutch engagement signal indicative of clutch pressure, and
  said decision logic unit generates said clutch touch point signal indicative of clutch pressure.

5. The touch point determinator as claimed in claim 2, wherein:
 said controller further includes
  a clutch engagement signal filter connected to said clutch engagement sensor for generating a filtered measured clutch engagement signal, and
  said decision logic unit setting said clutch touch point equal to said filtered measured clutch engagement signal when said transmission input speed signal is within a predetermined amount of said reference speed signal.

6. The touch point determinator as claimed in claim 1, wherein:
said decision logic unit of said controller sets said clutch touch point equal to said clutch engagement signal when said transmission input speed signal is within said predetermined amount of said reference speed signal.

7. The touch point determinator as claimed in claim 1, wherein:
said controller further includes
a prefilter connected to said reference speed generator for generating a filtered reference speed signal,
a lead compensation filter connected to said transmission input speed sensor for generating a filtered transmission input speed signal, and
wherein said first algebraic summer generates said first algebraic sum signal corresponding to the difference between (1) said filtered reference speed signal and (2) said filtered transmission input speed signal.

8. The touch point determinator as claimed in claim 1, wherein:
said controller further includes
a touch point offset generator for generating a touch point offset signal, and
a second algebraic summer connected to said decision logic unit and said touch point offset generator for forming a corrected clutch touch point corresponding to the difference between (1) said clutch touch point signal and (2) said touch point offset signal.

9. The touch point determinator as claimed in claim 1, wherein:
said reference speed generator generates said reference speed signal within the range of 40% to 60% of said idle speed.

10. The touch point determinator as claimed in claim 1, wherein:
said decision logic unit of said controller sets said clutch touch point equal to a measure of the clutch engagement when said transmission input speed signal is within 2% of said reference speed signal.

11. The touch point determinator as claimed in claim 1, wherein the friction clutch is initially disengaged; and
the compensator comprises means for supplying to said clutch actuator for engaging the friction clutch to minimize said first algebraic sum signal.

12. The touch point determinator as claimed in claim 1, wherein the friction clutch is initially engaged; and
the compensator comprises means for supplying to said clutch actuator for disengaging the friction clutch to minimize said first algebraic sum signal.

13. The touch point determinator as claimed in claim 1, wherein the friction clutch is initially engaged and the controller includes:
means for storing prior touch point value;
initialization means for partially disengaging the clutch to a degree of engagement just higher than the prior touch point; and
the compensator comprises means for generating said clutch engagement signal for supplying to said clutch actuator for further disengaging the friction clutch from the degree of engagement established by the initialization means to a degree to minimize said first algebraic sum signal.

14. In a combination including a source of motive power having a predetermined idle speed, a friction clutch for controllably transferring a predetermined torque from the source of motive power to a clutch output shaft, a multi-speed transmission having an input shaft connected to the clutch output shaft and including a neutral position, at least one inertially-loaded traction wheel connected to the output shaft of the multi-speed transmission, and an automatic clutch controller which controls a degree of clutch engagement, a method of determining a touch point signal of the friction clutch comprising the steps of:
operating the source of motive power at idle speed;
selecting the neutral position of the multi-speed transmission;
applying a predetermined braking torque to the output shaft of the friction clutch;
generating a reference speed signal less than the idle speed;
sensing a rotational speed of the output shaft of the friction clutch;
determining the difference between said reference speed signal and the sensed rotational speed of the output shaft of the friction clutch;
actuating the friction clutch to a degree of clutch engagement to minimize said difference;
determining the clutch touch point signal corresponding to the degree of clutch engagement if the sensed rotational speed of the output shaft of the friction clutch is within a predetermined amount of the reference speed signal.

15. The method of determining the touch point of the friction clutch as claimed in claim 14, further comprising the steps of:
filtering the reference speed signal;
filtering the sensed rotational speed of the output shaft of the friction clutch; and
wherein said step of forming the difference speed includes forming the difference between the filtered reference speed signal and the filtered sensed rotational speed of the output shaft of the friction clutch.

16. The method of determining the touch point of the friction clutch as claimed in claim 14, further comprising the steps of:
sensing the degree of clutch engagement; and
wherein said step of determining the clutch touch point signal sets the clutch touch point signal equal to the sensed degree of clutch engagement when the sensed rotational speed of the output shaft of the friction clutch is within a predetermined amount of the reference speed signal.

17. The method of determining the touch point of the friction clutch as claimed in claim 16, wherein:
said step of sensing the degree of clutch engagement consists of measuring the position of the friction clutch; and
said step of determining the clutch touch point signal sets the clutch touch point signal equal to the measured clutch position when the sensed rotational speed of the output shaft of the friction clutch is within a predetermined amount of the reference speed signal.

18. The method of determining the touch point of the friction clutch as claimed in claim 16, wherein:
said step of sensing the degree of clutch engagement consists of measuring the pressure of the friction clutch; and
said step of determining the clutch touch point signal sets the clutch touch point signal equal to the measured clutch pressure when the sensed rotational speed of the output shaft of the friction clutch is within a predetermined amount of the reference speed signal.

19. The method of determining the touch point of the friction clutch as claimed in claim 14, wherein:

said step of actuating the friction clutch to a degree to minimize said difference speed includes generating a clutch engagement signal corresponding to said difference speed, and actuating the friction clutch to a degree corresponding to said clutch engagement signal; and said step of determining the clutch touch point signal sets the clutch touch point signal equal to said clutch engagement signal when the sensed rotational speed of the output shaft of the friction clutch is within a predetermined amount of the reference speed signal.

20. The method of determining the touch point of the friction clutch as claimed in claim 14, further comprising the steps of:

filtering the sensed degree of clutch engagement; and wherein said step of determining the clutch touch point signal sets the clutch touch point signal equal to the filtered sensed degree of clutch engagement when the sensed rotational speed of the output shaft of the friction clutch is within a predetermined amount of the reference speed signal.

21. The method of determining the touch point of the friction clutch as claimed in claim 14, further comprising the steps of:

generating a touch point offset signal corresponding to the difference in clutch engagement between the clutch engagement when the friction clutch transfers said predetermined torque and when the friction clutch transfers just more than zero torque; and forming a corrected clutch touch point corresponding to the difference between (1) said clutch touch point signal and (2) said touch point offset signal.

22. The method of determining the touch point of the friction clutch as claimed in claim 14, wherein:

said reference speed signal is within the range of 40% to 60% of the idle speed.

23. The method of determining the touch point of the friction clutch as claimed in claim 14, wherein:

said step of determining the clutch touch point signal sets the clutch touch point corresponding to the degree of clutch engagement if the sensed rotational speed of the output shaft of the friction clutch is within 4% of the reference speed signal.

24. The method of determining the touch point of the friction clutch as claimed in claim 14, wherein the clutch is initially disengaged; and the step of actuating the friction clutch comprises engaging the friction clutch to a degree to minimize said difference speed.

25. The method of determining the touch point of the friction clutch as claimed in claim 14, wherein the clutch is initially engaged; and the step of actuating the friction clutch comprises disengaging the friction clutch to a degree to minimize said difference speed.

26. The method of determining the touch point of the friction clutch as claimed in claim 14, wherein the clutch is initially engaged; including the additional steps of:

storing touch point information from a previous operation;

partially disengaging the clutch by actuation to a point just above the stored touch point; and thereafter performing the actuating step by further disengaging the friction clutch to a degree to minimize said difference speed.

* * * * *